(12) United States Patent
Tsutsui (10) Patent No.: US 7,187,920 B2
(45) Date of Patent: Mar. 6, 2007

(54) CONNECTION SERVICE PROVIDING SYSTEM AND CONNECTION SERVICE PROVIDING METHOD

(75) Inventor: Takashi Tsutsui, Tokyo (JP)

(73) Assignee: Softbank Corporation, Tokyo (JP)

( * ) Notice: Subject to any disclaimer, the term of this patent is extended or adjusted under 35 U.S.C. 154(b) by 164 days.

(21) Appl. No.: 10/513,322

(22) PCT Filed: May 14, 2003

(86) PCT No.: PCT/JP03/06008

§ 371 (c)(1),
(2), (4) Date: Mar. 21, 2005

(87) PCT Pub. No.: WO03/098878

PCT Pub. Date: Nov. 27, 2003

(65) Prior Publication Data

US 2005/0164677 A1   Jul. 28, 2005

(30) Foreign Application Priority Data

May 15, 2002 (JP) .............................. 2002-140778

(51) Int. Cl.
*H04M 1/66* (2006.01)
(52) U.S. Cl. .................... 455/411; 455/435.2; 455/448; 380/248
(58) Field of Classification Search ................ 455/409, 455/411, 433, 435.2; 380/248
See application file for complete search history.

(56) References Cited

U.S. PATENT DOCUMENTS 5,657,373 A * 8/1997 Hermansson et al. .... 455/435.2
6,144,847 A * 11/2000 Altschul et al. ............. 455/407
6,430,407 B1 * 8/2002 Turtiainen ................... 455/411
6,466,804 B1 * 10/2002 Pecen et al. ................. 455/558
6,868,282 B2 * 3/2005 Carlsson ..................... 455/558
7,054,645 B1 * 5/2006 Infosino ................... 455/456.1
2002/0009199 A1 * 1/2002 Ala-Laurila et al. ........ 380/247
2003/0157926 A1 * 8/2003 Ala-Laurila et al. ........ 455/406

FOREIGN PATENT DOCUMENTS

| JP | 2000-341749 | 12/2000 |
|----|-------------|---------|
| JP | 2001-265689 | 9/2001 |
| JP | 2001-350724 | 12/2001 |
| JP | 2002-229951 | 8/2002 |

* cited by examiner

Primary Examiner—Nick Corsaro
Assistant Examiner—Simon A. Goetze
(74) Attorney, Agent, or Firm—Oblon, Spivak, McClelland, Maier & Neustadt, P.C.

(57) ABSTRACT

A network including a connection service providing system according to the present invention comprises mobile terminals 1 used by users, electronic devices 3, a wireless LAN base station 5, a connection-service-providing server 10, public network 2 for interconnecting a mobile terminal 1 and the connection-service-providing server 10, and a wide area network 4 for interconnecting a electronic device 3 and the connection-service-providing server 10. The connection-service-providing server 10 comprises a first identifier-acquisition unit 11, identifier-acquisition-time-instant measurement unit 12 (first time measurement unit), a second identifier-acquisition unit 13, a service-provision-start-time-instant measurement unit 14 (second time measurement unit), an authentication unit 15, and a connection control unit 16.

12 Claims, 5 Drawing Sheets

CONNECTION SERVICE PROVIDING SYSTEM AND CONNECTION SERVICE PROVIDING METHOD

TECHNICAL FIELD

The present invention relates to a connection service providing system and a connection service providing method for providing a connection service from an electronic device used by a user to a network.

BACKGROUND ART

In a connection service for a network, e.g., the Internet, when a user would like to be authenticated, the user should input his/her personal identification data (e.g., a user identification prescribed in advance by the service provider or a password settled by the user) into a terminal that the user would like to connect with the connection service, and send the identification from the terminal to the network. Conventionally, locations from which network connections were requested were limited to e.g., offices or homes. However, in recent years, network connections from various locations have increased with the permeation of ubiquitous computing on account of improvement in performance of mobile electronic devices and the global spread of the Internet. There is a demand to found a scheme for establishing secure connections readily with networks from anywhere.

However, in accordance with the above-mentioned method for user authentication, each user can use only a connection service for a network to which the user subscribes and in which he/she has registered his/her personal identification data. Although a network connection service can be provided for users who do not subscribe to the network, there is a problem that the network cannot identify the users.

On the other hand, when a mobile electronic device located in various shops, public facilities, or the like is connected to a network connection service, a wireless LAN scheme such as the IEEE 802.11 scheme has been used. However, security weakness has been pointed out with this kind of scheme. For example, with wireless LANs, eavesdropping is easier than in wired LANs.

Accordingly, it is an object of the present invention to provide a system and a method for providing a network connection service used in a location where the general public can access, wherein each user can be identified certainly.

DISCLOSURE OF THE INVENTION

In accordance with a first aspect of the present invention, a connection service providing system for providing a network connection service for an electronic device used by a user is provided. The system comprises first identifier acquisition means which acquires, from a mobile terminal used by the user, a terminal identifier for identifying the mobile terminal; first time measurement means which measures a time instant at which the first identifier acquisition means acquired the terminal identifier; a user information database which stores the time instant measured by the first time measurement means and the terminal identifier acquired by the first identifier acquisition means in such a manner that the time instant and the terminal identifier are correlated with each other; second identifier acquisition means which acquires the terminal identifier from the electronic device; and authentication means which authenticates the electronic device on the basis of the terminal identifier acquired by the first terminal identifier acquisition means and stored in the user information database and the other terminal identifier acquired by the second identifier acquisition means, the authentication means determining, on the basis of this authentication and a time period elapsed after the time instant measured by the first time measurement means, whether the connection service should be allowed to the electronic device or not.

According to this aspect, since the terminal identifier, e.g., the phone number for identifying the mobile terminal used by the user is acquired by the caller number notification from the mobile terminal, the user can be identified on the basis of the user information correlated with the phone number and registered by the service provider of the mobile terminal.

According to this aspect, the electronic device is authenticated on the basis of the phone number acquired by the first terminal identifier acquisition means and stored in the user information database and the other phone number acquired by the second identifier acquisition means, and then it is determined, on the basis of this authentication and a time period elapsed after the time instant measured by the first time measurement means, whether the connection service should be allowed to the electronic device or not.

Therefore, insofar as the time span from the time instant, at which the user used the mobile terminal to send the caller number notification indicating the phone number, to the time instant, at which the user used the electronic device to send the phone number of the mobile terminal, is within a predetermined time period, the utilization of the connection service is allowed to the user.

Only if the phone number acquired by the caller number notification from the mobile terminal coincides with the phone number acquired from the electronic device, the utilization of the connection service is allowed. Accordingly, surreptitious utilization of connection service by disguising a user or eavesdropping the phone number can be reduced.

A second aspect of the present invention comprises, in addition to the first aspect of the present invention, first timer means which measures the time period elapsed after the time instant, at which the terminal identifier was acquired, measured by the first time measurement means; and erasing means which erases the terminal identifier in the user information database on the basis of the measurement by the first timer means, wherein the authentication means determines whether the connection service should be allowed or not on the basis of whether or not the terminal identifier is stored in the user information database.

By virtue of the aspect, the erasing means erases the terminal identifier in the user information database on the basis of the measurement by the first timer means while the authentication means determines whether the connection service should be allowed or not, only on the basis of whether or not the terminal identifier is stored in the user information database. Accordingly, the process involved in authentication of the electronic device can be simplified and the necessary storage capacity of the user information database can be restricted.

A third aspect of the present invention comprises, in addition to the first aspect of the present invention, second time measurement means which measures a time instant at which the connection service for the electronic device started; second timer means which measures the time period elapsed after the time instant measured by the second time measurement means; and connection control means which ceases providing the connection service for the electronic device on the basis of the measurement by the second timer means.

By virtue of the aspect, since providing the connection service for the electronic device is ceased on the basis of the measurement by the second timer means, it is possible to cease providing the connection service for a user whose utilization time period has reached a predetermined limit.

A fourth aspect of the present invention comprises the third aspect of the present invention, wherein the second identifier acquisition means further acquires a predetermined code from the electronic device, wherein the authentication means authenticates the electronic device on the basis of the code in addition to the terminal identifiers, and wherein the connection control means ceases providing the connection service for the electronic device on the basis of the code and the measurement by the second timer means.

A fifth aspect of the present invention comprises the fourth aspect of the present invention, wherein the connection service is provided via a base station located in a predetermined area, wherein the code contains an area identifier identifying the area or the base station, and wherein the authentication means authenticates the electronic device on the basis of the area identifier in addition to the terminal identifiers.

By virtue of the aspect, since the authentication means authenticates the electronic device on the basis of the area identifier, e.g., the ESS-ID (Extended Service Set Identifier) used in wireless LANs in addition to the terminal identifiers, it is possible to identify the base station with which the electronic device communicates and thus the area where the electronic device access to the connection service.

A sixth aspect of the present invention comprises the first aspect of the present invention, wherein the first identifier acquisition means acquires the terminal identifier of the mobile terminal before completion of a connection of a call from the mobile terminal.

By virtue of the aspect, since the first identifier acquisition means acquires the phone number of the mobile terminal before completion of a connection of a call from the mobile terminal, the communication fee can be avoided for the acquisition.

A seventh aspect of the present invention is a connection service providing method for providing a network connection service for an electronic device used by a user. The method comprises: step (1) for acquiring, from a mobile terminal used by the user, a terminal identifier for identifying the mobile terminal; step (2) for measuring a time instant at which the terminal identifier was acquired at step (1); step (3) for storing in a user information database the time instant measured at step (2) and the terminal identifier acquired at step (1) in such a manner that the time instant and the terminal identifier are correlated with each other; step (4) for acquiring the terminal identifier from the electronic device; step (5) for authenticating the electronic device on the basis of the terminal identifier stored in the user information database and the other terminal identifier acquired at step (4), and for determining, on the basis of this authentication and a time period elapsed after the time instant measured at step (2), whether the connection service should be allowed to the electronic device or not.

An eighth aspect of the present invention comprises, in addition to the seventh aspect of the present invention, a step for measuring the time period elapsed after the time instant, at which the terminal identifier was acquired, measured at step (2), and for erasing the terminal identifier in the user information database on the basis of the measurement of the time period, wherein it is determined at step (5) whether the connection service should be allowed or not on the basis of whether or not the terminal identifier is stored in the user information database.

A ninth aspect of the present invention comprises, in addition to the seventh aspect of the present invention, step (6) for measuring a time instant at which the terminal identifier was acquired at step (4), for measuring the time period elapsed after this measured time instant, and for ceasing providing the connection service for the electronic device on the basis of this measurement of the elapsed time period.

A tenth aspect of the present invention comprises the ninth aspect of the present invention, wherein a predetermined code is further acquired at step (4) for the authentication, wherein the electronic device is authenticated on the basis of the code in addition to the terminal identifiers at step (5), and wherein providing the connection service for the electronic device is ceased at step (6) on the basis of the code and the measurement by the second timer means.

An eleventh aspect of the present invention comprises the tenth aspect of the present invention, wherein the connection service is provided via a base station located in a predetermined area, wherein the code contains an area identifier identifying the area or the base station, and wherein the electronic device is authenticated on the basis of the area identifier in addition to the terminal identifiers.

A twelfth aspect of the present invention comprises the seventh aspect of the present invention, wherein step (1) for acquiring the terminal identifier of the mobile terminal is executed before completion of a connection of a call from the mobile terminal.

BEST MODE FOR CARRYING OUT THE INVENTION

Overall Structure of the Connection Service Providing System

Figure 1:
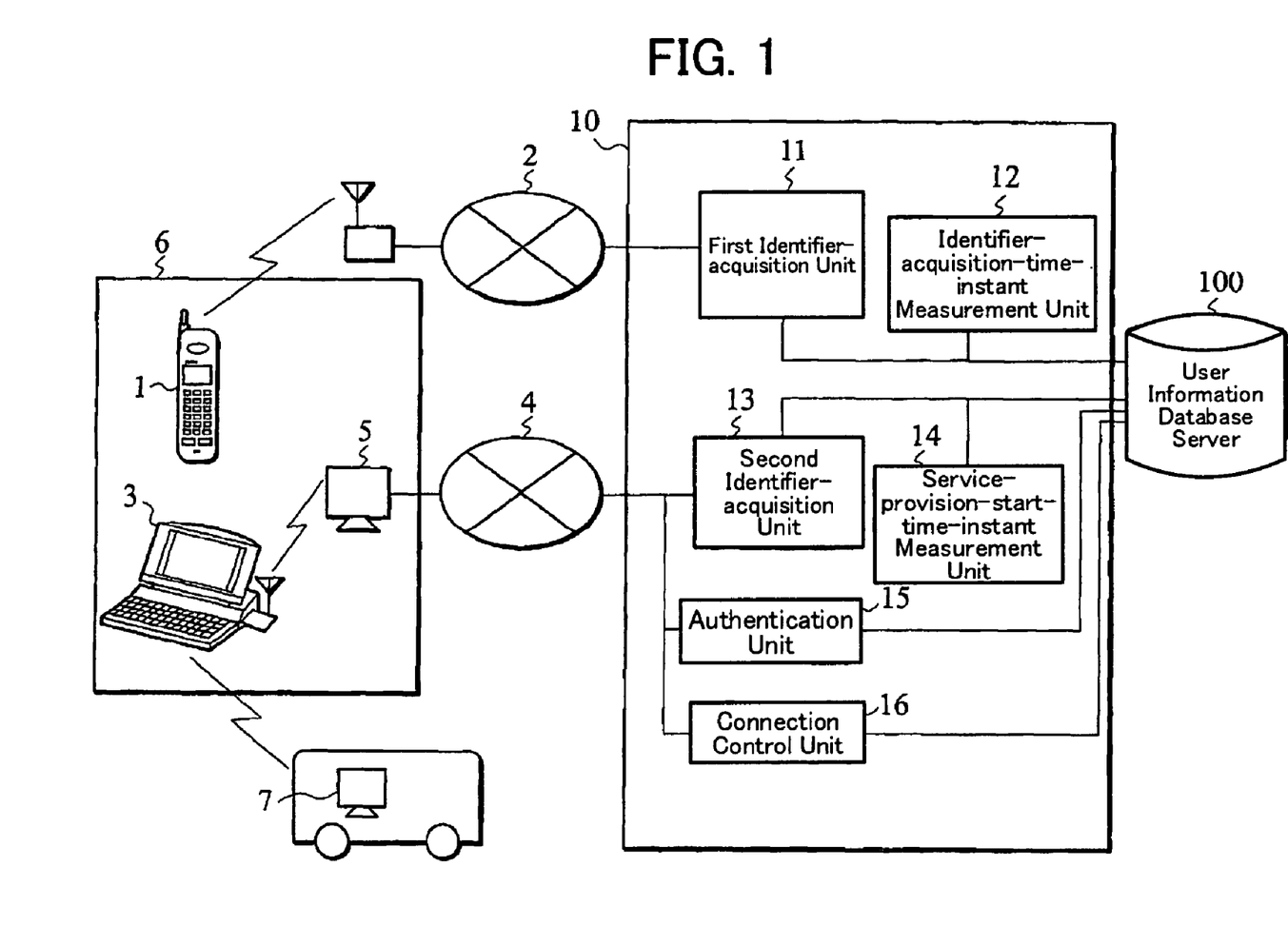
FIG. 1 is a schematic view showing a network connection service providing system according to an embodiment of the present invention.

With reference to the drawings, an embodiment of the present invention will be described. FIG. 1 is a schematic view showing a network connection service providing system according to an embodiment of the present invention.

As shown in FIG. 1, the network including the connection service providing system according to the present invention comprises mobile terminals 1 used by users, electronic devices 3, a wireless LAN base station 5, a connection-service-providing server 10, public network 2 for connecting the mobile terminals 1 with the connection-service-providing server 10, and a wide area network 4 for connecting the electronic devices 3 with the connection-service-providing server 10.

Each mobile terminal 1 is a device which can be connected to the public network 2, and includes, for example, a mobile phone used by a user and a terminal identifier (phone number or the like) assigned to the mobile phone.

Each electronic device 3 can communicate with the connection-service-providing server 10 via the wireless LAN base station 5 located in a service area 6, such as a shop or public facility using a wireless LAN scheme such as the IEEE 802.11 scheme. For example, the electronic device 3 may be a personal computer, a PDA (Personal Digital Assistant), and the like.

The wireless LAN base station 5 is located in the service area 6 and communicates with the electronic devices 3 through the above-mentioned wireless LAN scheme. In order to protect communication between the wireless LAN base station 5 and the electronic devices 3 from being eavesdropped by a pseudo wireless LAN base station 7 that may be located near the service area 6, a special identifier such as the ESS-ID (Extended Service Set Identifier) is added to the contents of communication and/or the contents are encrypted with the WEP (Wired Equivalent Privacy) algorithm.

The connection-service-providing server 10 can be realized by, e.g., an application server connected to the Internet. In the embodiment, the connection-service-providing server 10 comprises a first identifier-acquisition unit 11, an identifier-acquisition-time-instant measurement unit 12 (first time measurement unit), a second identifier-acquisition unit 13, a service-provision-start-time-instant measurement unit 14 (second time measurement unit), an authentication unit 15, and a connection control unit 16.

The connection-service-providing server 10 is connected with a user information database server 100 that manages information related to the users of the connection service.

The first identifier-acquisition unit 11, which is connected with the public network 2, acquires the terminal identifier (phone number or the like) transmitted from the mobile terminal 1 and transmits the acquired terminal identifier as a user's terminal identifier to the user information database server 100.

For example, when a user uses a mobile terminal 1 to initiate a call to the phone number assigned to the first identifier-acquisition unit 11, the mobile terminal 1 can notify the first identifier-acquisition unit 11 of the phone number allocated to the mobile terminal 1 by means of the caller number notification. The first identifier-acquisition unit 11 acquires the phone number of the mobile terminal 1 reported by the caller number notification. The first identifier-acquisition unit 11 may be realized by, e.g., an IVR (Interactive Voice Response) system. The terminal identifier may be another scheme, such as a UIM (User Identity Module), which can identify the user of the mobile terminal 1, instead of the above-mentioned phone number of the mobile terminal 1.

The first identifier-acquisition unit 11 can acquire the phone number assigned to the mobile terminal 1 before completion of a connection of a call between the mobile terminal 1 and the first identifier-acquisition unit 11. Therefore, if the user of the mobile terminal 1 ceases the call connection hearing the ring-back tone before the completion of the call establishment, the communication fee can be avoided for the number notification.

The identifier-acquisition-time-instant measurement unit 12 measures the time instant at which the first identifier-acquisition unit 11 acquired the terminal identifier of the mobile terminal 1, and transmits information on this time instant to the user information database server 100.

The second identifier-acquisition unit 13, which is connected to the wide area network 4, and acquires the phone number of the mobile terminal 1 and a predetermined code from the electronic device 3 via the wireless LAN base station 5. The second identifier-acquisition unit 13 transmits the acquired phone number and the predetermined code to the user information database server 100.

More specifically, the user of the mobile terminal 1 inputs the phone number allocated to the mobile terminal 1 to electronic device 3. The electronic device 3 transmits the input phone number to the second identifier-acquisition unit 13 via the wide area network 4. The second identifier-acquisition unit 13 acquires the phone number of the mobile terminal 1 transmitted from the electronic device 3.

The predetermined code, which will be referred to as an "access code," is a unique number defined by the connection service provider discretionarily. The access code may contain an area identifier, e.g., the ESS-ID, that identifies the service area 6 or the wireless LAN base station 5. An exemplified method for offering such access codes to users of the connection service is distributing scratch cards or the like, on each of which an access code is printed, at shops and so on within the service area 6 with or without charge.

The service-provision-start-time-instant measurement unit 14 measures the time instant at which the second identifier-acquisition unit 13 acquired the phone number of the mobile terminal 1 from the electronic device 3. Then, the service-provision-start-time-instant measurement unit 14 transmits the measured time instant to the user information database server 100.

The user information database server 100 records the phone number of the mobile terminal 1 acquired by the first identifier-acquisition unit 11; the time instant, which was measured by the identifier-acquisition-time-instant measurement unit 12, at which the phone number was acquired from the mobile terminal 1; and the time instant, which was measured by the service-provision-start-time-instant measurement unit 14, at which the phone number was acquired from the electronic device 3. The user information database server 100 stores them in such a manner that the time instants and the phone number are correlated with one another.

Figure 2:
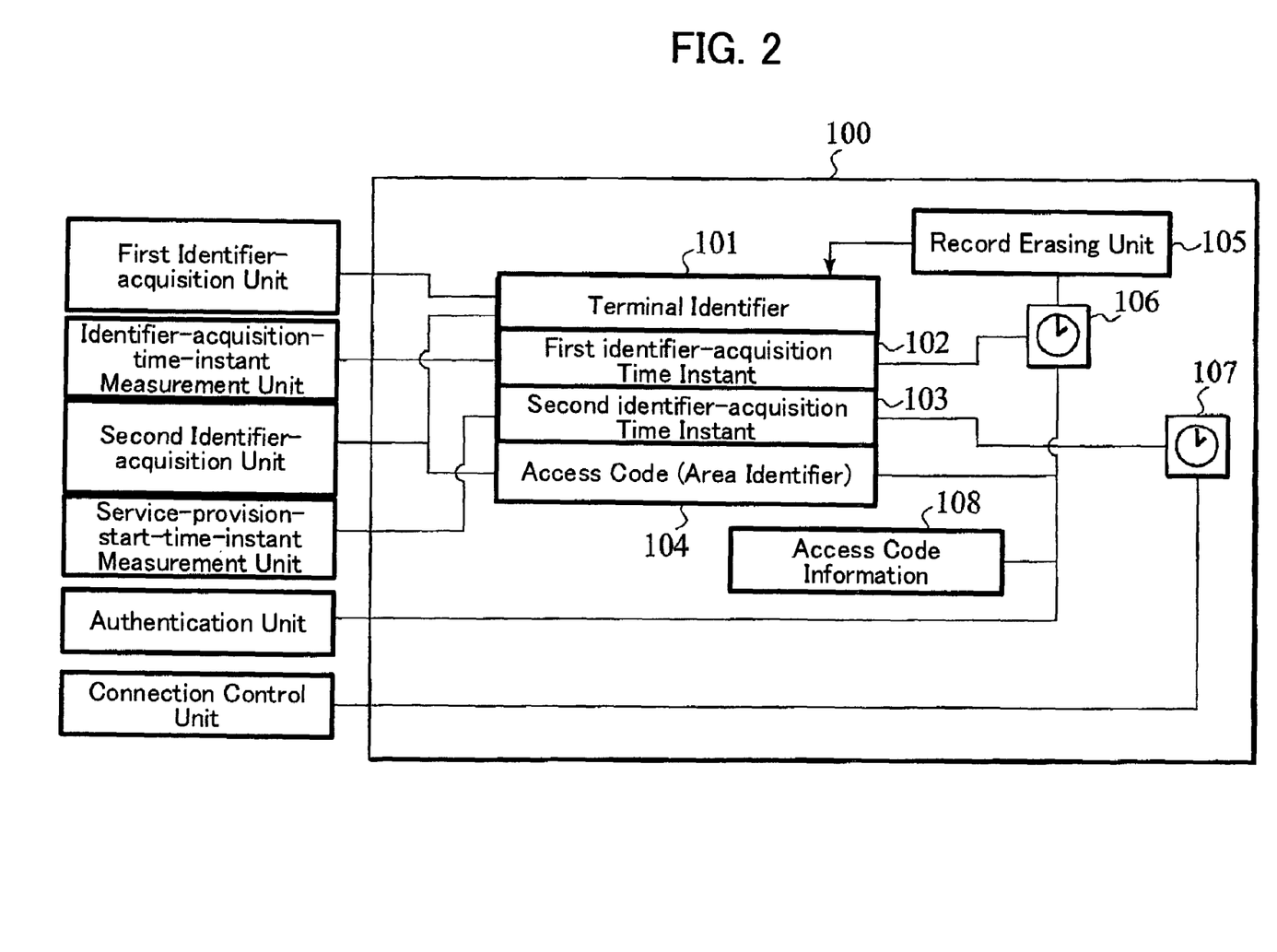
FIG. 2 is a block diagram showing a user information database in the network connection service providing system according to the embodiment of the present invention.

More specifically, as shown in FIG. 2, the user information database server 100 stores a terminal identifier 101, a first identifier-acquisition time instant 102, a second identifier-acquisition time instant 103, and an access code 104 in the embodiment. The user information database server 100 can be realized by a relational database server.

The terminal identifier 101 is the phone number of the mobile terminal 1 of which the first identifier-acquisition unit 11 was notified by the mobile terminal 1.

The first identifier-acquisition time instant 102 is the time instant at which the first identifier-acquisition unit 11 acquired the phone number from mobile terminal 1.

The second identifier-acquisition time instant 103 is the time instant at which the second identifier-acquisition unit 13 acquired the terminal identifier 101 and the access code 104 from the electronic device 3.

Furthermore, the user information database server 100 includes a record erasing unit 105 (erasing means), an access-permissible-period timer 106 (first timer means), and a service-provision-period timer 107 (second timer means).

The record erasing unit 105 erases a record in the user information database server 100 on the basis of the measurement by the access-permissible-period timer 106.

The access-permissible-period timer 106 measures the elapsed time after the time instant measured by the identifier-acquisition-time-instant measurement unit 12.

More specifically, the access-permissible-period timer 106 notifies the record erasing unit 105 of the fact that a predetermined set time period (e.g., 30 minutes or an hour) has elapsed since the time instant at which the user utilized the mobile terminal 1 to notify the connection-service-providing server 10 of the phone number. The record erasing unit 105 erases the terminal identifier 101 (i.e., the phone number of the mobile terminal 1) and the first identifier-acquisition time instant 102 (i.e., the time instant at which the phone number was acquired from the mobile terminal 1) in the user information database server 100.

The service-provision-period timer 107 measures the elapsed time after the time instant, which was measured by the service-provision-start-time-instant measurement unit 14, at which the second identifier-acquisition unit 13 acquired the phone number of the mobile terminal 1 sent by the user with the electronic device 3.

The authentication unit 15 in the connection-service-providing server 10 as shown in FIG. 1 collates the phone number of the mobile terminal 1 acquired by the second identifier-acquisition unit 13 from the electronic device 3 with the terminal identifier 101 stored in the user information database server 100. In addition, the authentication unit 15 determines whether the connection service should be allowed to the electronic device 3 or not on the basis of this collation and the elapsed time measured by the access-permissible-period timer 106 after the time instant at which the phone number was acquired from the mobile terminal 1.

Additionally, the electronic device 3 transmits the access code 104 together with the terminal identifier 101, whereby the authentication unit 15 may authenticate the electronic device 3 on the basis of the terminal identifier 101 and the access code 104. As mentioned above, the access code 104 is a number or the like defined by the connection service provider discretionarily. An exemplified method for offering the access codes to users is distributing scratch cards, on each of which an access code is printed.

In this case, the user information database server 100 stores the number defined by the connection service provider as access code information 108. The authentication unit 15 collates the terminal identifier 101 and access code 104 which have been acquired from the mobile terminal 1 with the access code information 108 stored in the user information database server 100, thereby determining whether the connection service should be allowed to the electronic device 3.

The connection control unit 16 ceases providing the connection service to the electronic device 3 on the basis of the measurement by the service-provision-period timer 107. If the time period measured by the service-provision-period timer 107 has exceeded a prescribed time period, the connection control unit 16 notifies the electronic device 3 of the remaining available time period. In addition, if the remaining available time period has elapsed, the connection control unit 16 can disconnect the session with the electronic device 3.

Connection Service Providing Method by the Connection Service Providing System

A connection service providing method by the connection service providing system having the above-described structure according to the embodiment will be described hereinafter.

Figure 3:
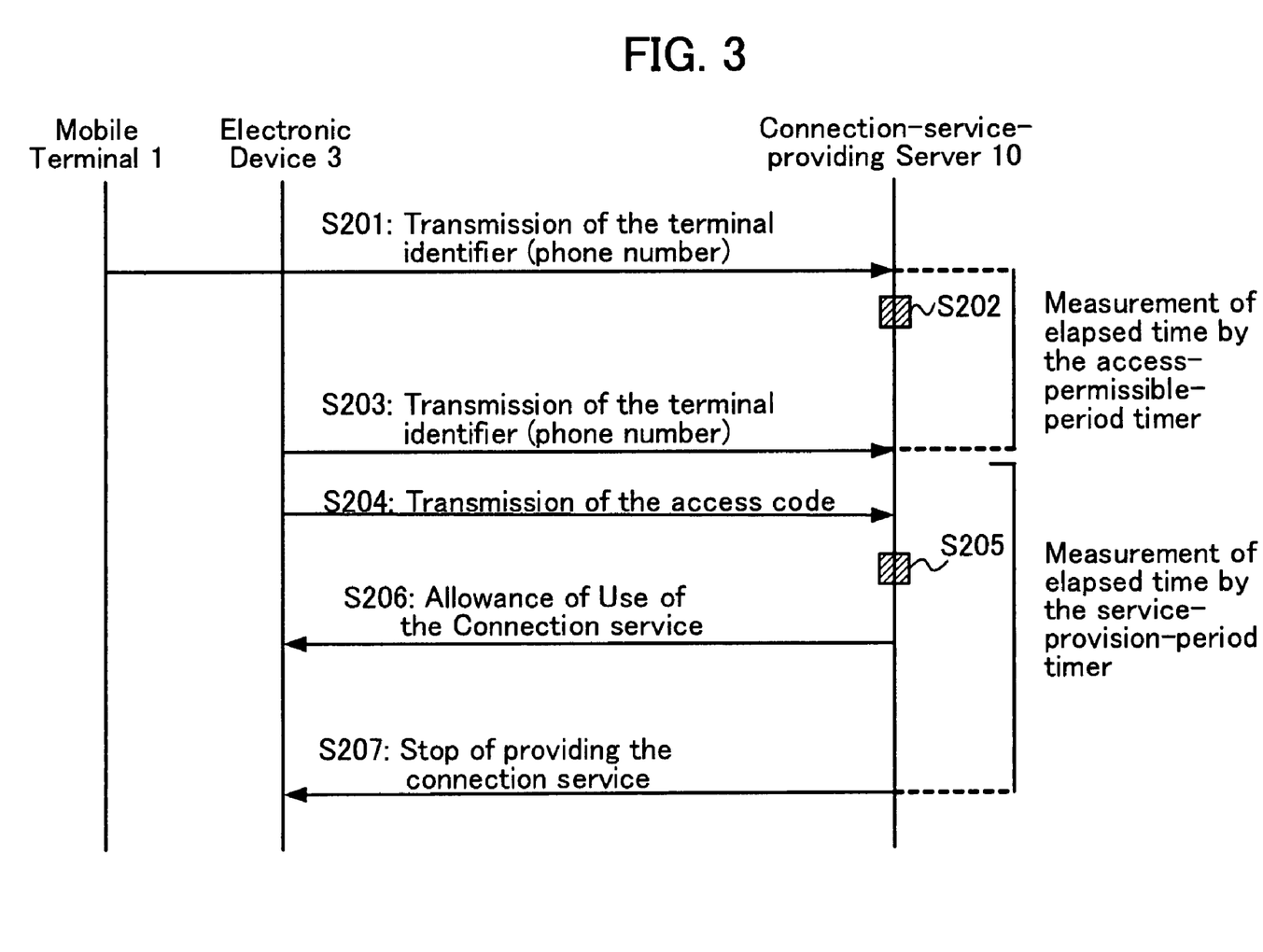
FIG. 3 is a sequence diagram showing a network connection service providing method according to the embodiment.

FIG. 3 is a sequence diagram showing a network connection service providing method according to the embodiment. First, a user who would like to use the connection service uses a mobile terminal 1 to initiate a call to the connection-service-providing server 10, thereby transmitting the terminal identifier (i.e., the phone number according to the embodiment) of the mobile terminal 1 to the connection-service-providing server 10 by the caller number notification (S201).

The connection-service-providing server 10 acquires the phone number of the mobile terminal 1, and then stores information on the acquired phone number in the user information database server 100 (S202). Although the mobile terminal 1 sends the connection-service-providing server 10 the phone number of the mobile terminal 1, it is unnecessary that the connection-service-providing server 10 responds to the call initiation from the mobile terminal 1. Therefore, the connection-service-providing server 10 can acquire the phone number of the mobile terminal 1 by the caller number notification before completion of the call connection with the mobile terminal.

The user who sent the phone number of the mobile terminal 1 at step S201, in turn, connects the electronic device 3 in the service area 6 to the connection-service-providing server 10 via the wireless LAN base station 5, thereby transmitting the phone number of the mobile terminal 1 (S203).

Additionally, the user uses the electronic device 3 to send the connection-service-providing server 10 the access code printed on the scratch card distributed at a shop and the like within the service area 6 (S204).

The connection-service-providing server 10 that acquired the phone number of the mobile terminal 1 and the access code from the electronic device 3 collates the phone number acquired from the mobile terminal 1 at step S201 with the phone number acquired from the electronic device 3 at step S203, thereby confirming whether they coincides with each other or not. The connection-service-providing server 10 further collates the access code acquired from the electronic device 3 at step S204 with the access code information 108 stored in the user information database server 100 (S205).

If it has been confirmed that the acquired phone numbers coincide with each other and the access code is legitimate and if the time span between the time instant at which the phone number was acquired from the mobile terminal 1 and the time instant at which the other phone number was acquired from the electronic device 3 is within a predetermined time period that can be measured by the access-permissible-period timer 106, the connection-service-providing server 10 allows providing the connection service to the electronic device 3 (S206).

Furthermore, the connection-service-providing server 10 ceases providing the connection service to the electronic device 3 (S208) if the elapsed time period measured by the service-provision-period timer 107 has reached the prescribed time period.

Figure 4:
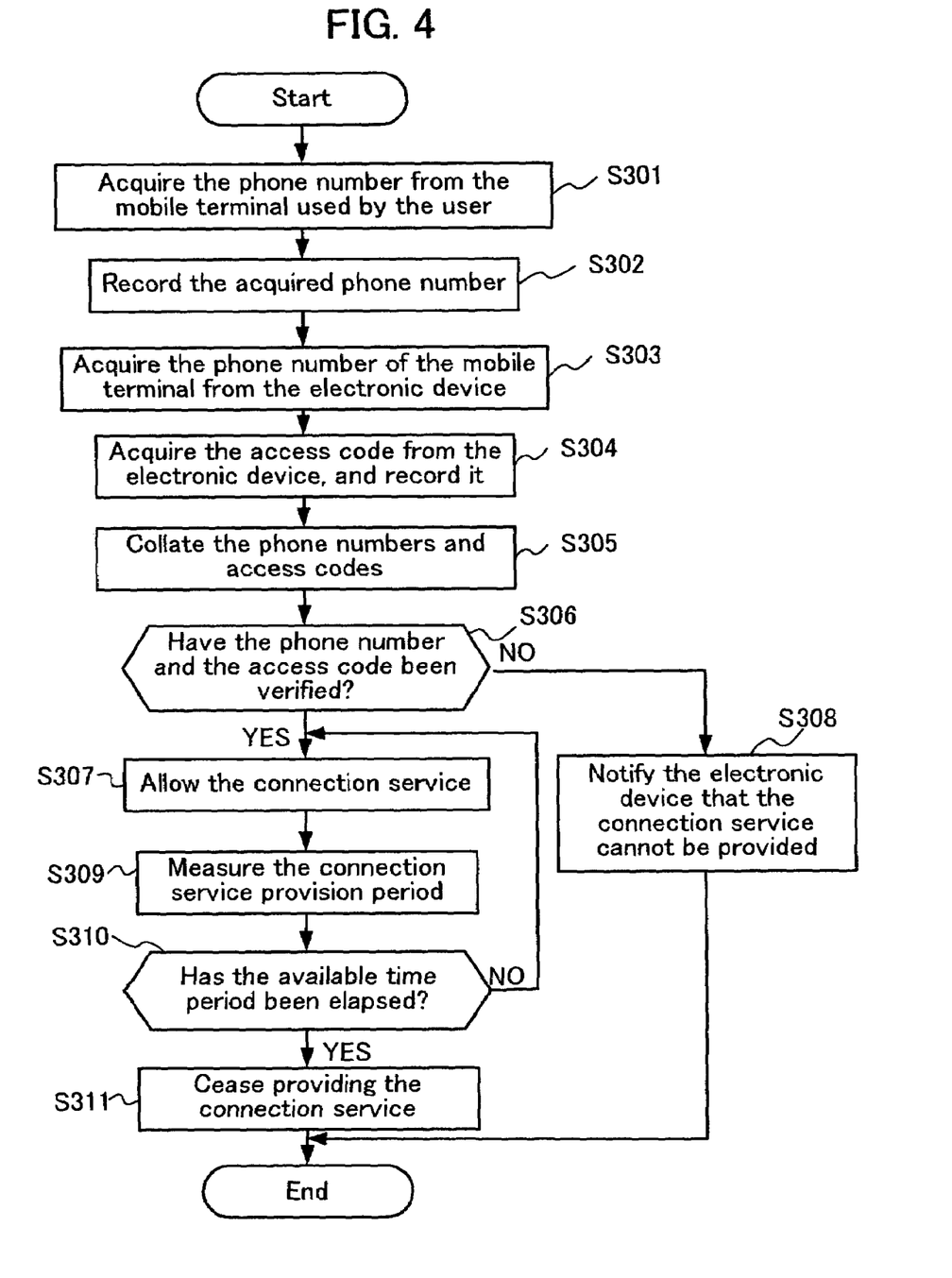
FIG. 4 is a flow chart showing operations of a connection-service-providing server according to the embodiment.

Next, internal operations of the connection-service-providing server 10 will be described in detail. FIG. 4 is a flow chart showing operations of the connection service providing method by the connection-service-providing server 10 according to the present embodiment.

The connection-service-providing server 10 first acquires the terminal identifier (i.e., the phone number according to the embodiment) of the mobile terminal 1 by the caller number notification from the mobile terminal 1 (S301). Then, the connection-service-providing server 10 records the acquired phone number as the terminal identifier 101 in the user information database server 100 (S302).

Next, the user of the connection service uses the electronic device 3 to send the phone number of the mobile terminal 1 to the connection-service-providing server 10, whereby the connection-service-providing server 10 acquires from the electronic device 3 the phone number of the mobile terminal 1 (S303). In turn, the connection-service-providing server 10 acquires the access code from the electronic device 3, and records the access code as the access code 104 in the user information database server 100 in such a manner that the access code 104 is correlated with the terminal identifier 101 (S304).

Furthermore, the connection-service-providing server 10 collates the phone number of the mobile terminal 1 acquired from the electronic device 3 with the terminal identifier 101, and collates the access code 104 with the access code information 108 (S305). In addition, if the access code 104 contains an identification (ESS-ID or the like) for identifying the service area 6 or the wireless LAN base station 5, the connection-service-providing server 10 can identify from which service area 6 the user accesses, on the basis of the access code 104.

The connection-service-providing server 10 allows the connection service to the electronic device 3 at step S307 if the phone number and the access code have been verified according to the collation (if the decision at step S306 is "Yes"). On the other hand, if the phone number is not verified or the access code is not legitimate (if the decision at step S306 is "No"), the connection-service-providing server 10 notifies the electronic device 3 that the connection service cannot be provided to the electronic device 3 (S308). Additionally, the connection-service-providing server 10 notifies the electronic device 3 that the connection service cannot be provided to the electronic device 3 when the terminal identifier 101 in the user information database server 100 has been erased by an operation of the access-permissible-period timer 106 which will be described later.

Next, the connection-service-providing server 10 records the time instant at which the phone number was acquired from the electronic device 3 (i.e., the time instant at which the connection service was allowed to the electronic device 3) as the second identifier-acquisition time instant 103 in the user information database server 100, and measures the elapsed time period from this time instant with the service-provision-period timer 107 (S309).

If a predetermined time period has elapsed since the time instant at which the connection service was allowed to the electronic device 3 (if the decision at step S310 is "Yes"), the connection-service-providing server 10 ceases providing the connection service to the electronic device 3 (S311).

Figure 5:
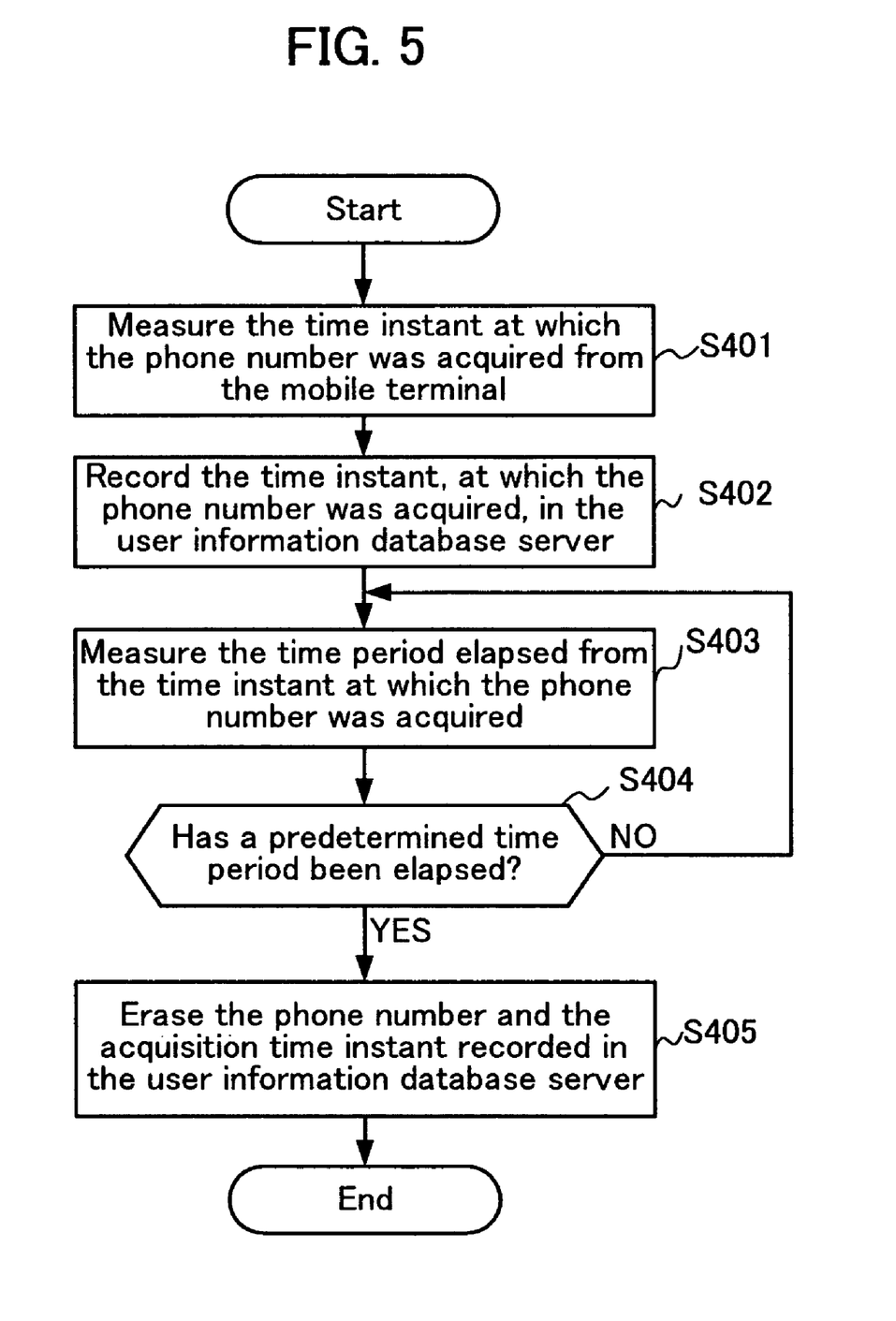
FIG. 5 is a flow chart showing operations of the connection-service-providing server according to the embodiment.

FIG. 5 is a flow chart showing operations related to the access-permissible-period timer 106 in the connection-service-providing server 10.

First, the connection-service-providing server 10 measures at step S401 the time instant at which the phone number of the mobile terminal 1 was acquired at step S301. The connection-service-providing server 10 records information on the time instant measured at step S401 as the first identifier-acquisition time instant 102 in the user information database server 100 such that the first identifier-acquisition time instant 102 is correlated with the terminal identifier 101 (S402).

Then, the connection-service-providing server 10 measures the time period elapsed from the time instant, at which the phone number of the mobile terminal 1 was acquired, using the access-permissible-period timer 106 (S403).

The connection-service-providing server 10 erases the terminal identifier 101 (the phone number) and the first identifier-acquisition time instant 102 (the time instant at which the phone number was acquired) at step S405 if a predetermined time period has elapsed since the time instant at which the phone number of the mobile terminal 1 was acquired (if the decision at step S404 is "Yes"). If the access code 104 has been also recorded such that it is correlated with the terminal identifier 101, the connection-service-providing server 10 erases the access code 104 together with the terminal identifier 101.

Advantages and Effects of the Connection Service Providing System and the Connection Service Providing Method According to the connection service providing system and the connection service providing method of the present embodiment, the terminal identifier, i.e., the phone number for identifying the mobile terminal 1 is acquired by the caller number notification from the mobile terminal 1 used by the user. Therefore, the user can be identified on the basis of the user information correlated to the phone number and registered by the service provider of the mobile terminal 1.

Consequently, according to the connection service providing system and the connection service providing method, it is possible to identify the person who would like to use the connection service but does not subscribe to the connection service. Therefore, it is easy to identify a tortfeasor and the like when a tort is done via the connection service.

According to the connection service providing system and the connection service providing method of the present embodiment, the electronic device 3 is authenticated on the basis of the phone number acquired by the first identifier-acquisition unit 11 and the other phone number acquired by the second identifier-acquisition unit 13, both of which are stored in the user information database server 100. In addition, it is determined whether the connection service should be allowed to the electronic device 3 on the basis of this authentication and the time period elapsed after the time instant measured by the access-permissible-period timer 106.

Therefore, insofar as the time span from the time instant, at which the user used the mobile terminal 1 to send the caller number notification indicating the phone number, to the time instant, at which the user used the electronic device 3 to send the phone number of the mobile terminal 1, is within a predetermined time period, the utilization of the connection service is allowed to the user. The connection-service-providing server 10 provides the connection service only if the phone number acquired by the caller number notification from the mobile terminal 1 coincides with the phone number acquired from the electronic device 3. Accordingly, surreptitious utilization of connection service by disguising a user or eavesdropping the phone number can be reduced.

Furthermore, according to the connection service providing system and the connection service providing method, the time period permissible for providing the connection service is limited to the predetermined time period. In addition, since it is necessary to report the phone number with the mobile terminal 1 in order to use the connection service, surreptitious utilization of the connection service can be reduced although the communication is eavesdropped by the pseudo wireless LAN base station 7 which may be located near the service area 6.

According to the connection service providing system and the connection service providing method of the present embodiment, the record erasing unit 105 erases the terminal identifier 101 in the terminal identifier 101 on the basis of the access-permissible-period timer 106. Additionally, the authentication unit 15 determines whether the connection service should be allowed or not only on the basis of whether or not the terminal identifier 101 is stored in the user information database 100. Therefore, the process involved in the authentication of the electronic device 3 can be simplified while the necessary storage capacity of the user information database server 100 can be restricted.

According to the connection service providing system and the connection service providing method of the present embodiment, since providing the connection service for the electronic device is ceased on the basis of the measurement by the service-provision-period timer 107, it is possible to cease providing the connection service for a user whose utilization time period has reached a predetermined limit.

Additionally, if the time period available for the connection service is set for each of the access codes transmitted from the electronic devices 3, the utilization time period of the connection service can be managed for each user. Furthermore, if the shop or the like within the service area 6 distributes the scratch cards, each on which the access code is printed, together with articles for sale and the like that the shop treats, it is possible to improve utilization of the shop and to contribute to promote sales of the articles and the like.

According to the connection service providing system and the connection service providing method of the present embodiment, since the authentication unit 15 authenticates the electronic device 3 on the basis of the area identifier, e.g., the ESS-ID in addition to the terminal identifiers, it is possible to identify the wireless LAN base station 5 with which the electronic device 3 communicates and thus the service area 6 where the electronic device 3 access to the connection service.

According to the connection service providing system and the connection service providing method of the present embodiment, since the first identifier-acquisition unit 11 acquires the phone number of the mobile terminal 1 before completion of a connection of a call from the mobile terminal 1, the communication fee can be avoided for the acquisition.

Modification

It is not intended to limit the present invention to the above-described embodiment. Rather, the embodiment may be modified as will be described below.

The service provider of the connection service may register in advance an ID for using the network connection service and the phone number of the mobile terminal 1 in the user information database server 100 in such a manner that the ID and the phone number are correlated to each other. In this case, the user of the connection service should register the phone number of the mobile terminal 1 that the user uses before he/she uses the connection service in the service area 6.

Next, the phone number of the mobile terminal 1 acquired by the first identifier-acquisition unit 11 and the ID acquired by the second identifier-acquisition unit 13 from the electronic device 3 are collated with the correlation registered previously. If the combination of the phone number of the mobile terminal acquired by the first identifier-acquisition unit 11 and the ID acquired by the second identifier-acquisition unit 13 coincides with the correlation registered previously in the user information database 100, the user is allowed to use the connection service.

In this modification, both of transmission of the phone number by the mobile terminal 1 and transmission of the ID by the electronic device 3 are necessary for using the connection service. Therefore, surreptitious utilization of the connection service due to eavesdropping with the pseudo wireless LAN base station 7 and so on may further be reduced.

INDUSTRIAL APPLICABILITY

As has been described above, by virtue of the present invention, there is provided a system and a method for providing a network connection service used in a location. Where the general public can access, wherein each user can be identified certainly.

The invention claimed is:

1. A connection service providing system for providing a network connection service for an electronic device used by a user, comprising:

first identifier acquisition means which acquires, from a mobile terminal used by the user, a terminal identifier for identifying the mobile terminal;

first time measurement means which measures a time instant at which the first identifier acquisition means acquired the terminal identifier;

a user information database which stores the time instant measured by the first time measurement means and the terminal identifier acquired by the first identifier acquisition means in such a manner that the time instant and the terminal identifier are correlated with each other;

second identifier acquisition means which acquires the terminal identifier from the electronic device; and authentication means which authenticates the electronic device on the basis of the terminal identifier acquired by the first terminal identifier acquisition means and stored in the user information database and the other terminal identifier acquired by the second identifier acquisition means, the authentication means determining, on the basis of this authentication and a time period elapsed after the time instant measured by the first time measurement means, whether the connection service should be allowed to the electronic device or not.

2. The connection service providing system as recited in claim 1, further comprising:

first timer means which measures the time period elapsed after the time instant, at which the terminal identifier was acquired, measured by the first time measurement means; and erasing means which erases the terminal identifier in the user information database on the basis of the measurement by the first timer means, wherein the authentication means determines whether the connection service should be allowed or not on the basis of whether or not the terminal identifier is stored in the user information database.

3. The connection service providing system as recited in claim 1, further comprising:

second time measurement means which measures a time instant at which the connection service for the electronic device started;

second timer means which measures the time period elapsed after the time instant measured by the second time measurement means; and connection control means which ceases providing the connection service for the electronic device on the basis of the measurement by the second timer means.

4. The connection service providing system as recited in claim 3, wherein the second identifier acquisition means further acquires a predetermined code from the electronic device, wherein the authentication means authenticates the electronic device on the basis of the code in addition to the terminal identifiers, and wherein the connection control means ceases providing the connection service for the electronic device on the basis of the code and the measurement by the second timer means.

5. The connection service providing system as recited in claim 4, wherein the connection service is provided via a base station located in a predetermined area, wherein the code contains an area identifier identifying the area or the base station, and wherein the authentication means authenticates the electronic device on the basis of the area identifier in addition to the terminal identifiers.

6. The connection service providing system as recited in claim 1, wherein the first identifier acquisition means acquires the terminal identifier of the mobile terminal before completion of a connection of a call from the mobile terminal.

7. A connection service providing method for providing a network connection service for an electronic device used by a user, comprising:
   step (1) for acquiring, from a mobile terminal used by the user, a terminal identifier for identifying the mobile terminal;
   step (2) for measuring a time instant at which the terminal identifier was acquired at step (1);
   step (3) for storing in a user information database the time instant measured at step (2) and the terminal identifier acquired at step (1) in such a manner that the time instant and the terminal identifier are correlated with each other;
   step (4) for acquiring the terminal identifier from the electronic device;
   step (5) for authenticating the electronic device on the basis of the terminal identifier stored in the user information database and the other terminal identifier acquired at step (4), and for determining, on the basis of this authentication and a time period elapsed after the time instant measured at step (2), whether the connection service should be allowed to the electronic device or not.

8. The connection service providing method as recited in claim 7, further comprising:
   a step for measuring the time period elapsed after the time instant, at which the terminal identifier was acquired, measured at step (2), and for erasing the terminal identifier in the user information database on the basis of the measurement of the time period,
   wherein it is determined at step (5) whether the connection service should be allowed or not on the basis of whether or not the terminal identifier is stored in the user information database.

9. The connection service providing method as recited in claim 7, further comprising:
   step (6) for measuring a time instant at which the terminal identifier was acquired at step (4), for measuring the time period elapsed after this measured time instant, and for ceasing providing the connection service for the electronic device on the basis of this measurement of the elapsed time period.

10. The connection service providing method as recited in claim 9, wherein a predetermined code is further acquired at step (4) for the authentication, wherein the electronic device is authenticated on the basis of the code in addition to the terminal identifiers at step (5), and wherein providing the connection service for the electronic device is ceased at step (6) on the basis of the code and the measurement by the second timer means.

11. The connection service providing method as recited in claim 10, wherein the connection service is provided via a base station located in a predetermined area, wherein the code contains an area identifier identifying the area or the base station, and wherein the electronic device is authenticated on the basis of the area identifier in addition to the terminal identifiers.

12. The connection service providing method as recited in claim 7, wherein step (1) for acquiring the terminal identifier of the mobile terminal is executed before completion of a connection of a call from the mobile terminal.

* * * * *